United States Patent
Kitagawa et al.

(10) Patent No.: US 7,109,279 B2
(45) Date of Patent: Sep. 19, 2006

(54) POLYMERIZATION METHOD IN PORES OF POROUS METAL COMPLEX

(75) Inventors: Susumu Kitagawa, Neyagawa (JP); Takashi Uemura, Kyoto (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 11/212,683

(22) Filed: Aug. 29, 2005

(65) Prior Publication Data

US 2006/0189770 A1    Aug. 24, 2006

(30) Foreign Application Priority Data

Feb. 21, 2005    (JP) .............................. 2005-043677

(51) Int. Cl.
*C08F 4/80* (2006.01)
*C08F 38/00* (2006.01)

(52) U.S. Cl. ...................... 526/172; 526/192; 526/265; 526/346; 526/904

(58) Field of Classification Search ................ 526/170, 526/171, 285, 346, 904, 172, 192, 265
See application file for complete search history.

(56) References Cited

FOREIGN PATENT DOCUMENTS

| JP | 9-227572 | 9/1997 |
|---|---|---|
| JP | 2004-196594 | 7/2004 |

OTHER PUBLICATIONS

Solomon et al, Chemistry of Pigments and Fillers, Wiley Interscience (1983) pp. 1, 30-32.*
Chemistry Industry, vol. 53, 2002, pp. 808-815.
Enzel, Patricia et al., "Inclusion of Polyaniline Filaments in Zeolite Molecular Sieves", J. Phys. Chem. 1989, vol. 93, No. 17, pp. 6270-6272.
Kondo, Mitsuru et al., "Rational Synthesis of Stable Channel-Like Cavities with Methane Gas Adsorption Properties: [{Cu$_2$(pzdc)$_2$(L)}$_n$] (pzdc = pyrazine-2-3-dicarboxylate; L = a Pillar Ligand)", Angew. Chem. Int. Ed. 1999, vol. 38, No. $^{1}/_{2}$, pp. 140-143.
Polymer Preprints, Japan, vol. 53, No. 2, 2004, pp. 2402-2403.
Seki, K. et al., "Syntheses and Characterization of Microporous Coordination Polymers with Open Frameworks", J. Phys. Chem. B, 2002, vol. 106, No. 6, pp. 1380-1385.
The 54$^{th}$ Symposium on Coordination Chemistry of Japan, Kumamoto, Published Sep. 1, 2004, 5 pp.
The 85$^{th}$ Spring Meeting of the Chemical Society of Japan, 2005, 3C6-45 and 3C6-46, Published on Mar. 1, 2005, 8 pp.

* cited by examiner

*Primary Examiner*—Fred Teskin
(74) *Attorney, Agent, or Firm*—Foley & Lardner LLP

(57) ABSTRACT

There is provided a method for producing a polymer, which is characterized by polymerizing or copolymerizing an organic compound monomer or monomers accommodated in pores of a porous metal complex.

6 Claims, No Drawings

POLYMERIZATION METHOD IN PORES OF POROUS METAL COMPLEX

BACKGROUND OF THE INVENTION

1. Field of the Invention

The present invention relates to a method of producing a polymer by polymerizing or copolymerizing a monomer accommodated in pores of a porous metal complex, and more specifically to a method of producing a polymer by polymerizing or copolymerizing an unsaturated organic compound accommodated in pores of a porous coordination polymer.

2. Background of the Invention

It has been known that a porous crystal having pores of approximately 1 nm or less prepared from an organic ligand and a metal ion can accommodate a low-molecular compound in these pores. It is disclosed, for example, in JP-A-9-227572, JP-A-2004-196594, and Chemical Industry, vol. 53, 2002, 808 that a coordination polymer composed of a copper ion and an organic ligand is superior in storage capacity of methane or oxygen. These references, however, are directed to utilization of a coordination polymer as a storage material for a low-molecular compound (gas), and it is not reported that an accommodated low-molecular compound is polymerized therein.

SUMMARY OF THE INVENTION

According to the present invention there is provided a method of producing a single chain polymer or polymer of narrow molecular-weight distribution.

The present invention relates to the following aspects (1) to (7).

(1) A method for producing a polymer, which comprises polymerizing or copolymerizing an organic compound monomer or monomers accommodated in pores of a porous metal complex.

(2) A method according to item (1) above, wherein the porous metal complex is a coordination polymer having a porous three-dimensional structure composed of a transition metal cation(s) and an organic bridging ligand connecting the metal cations.

(3) A method according to item (1) or (2) above, wherein the organic compound monomer or monomers is at least one unsaturated organic compound having 2 to 10 carbon atoms.

(4) A method according to items (2) or (3), wherein the coordination polymer has a structure in which two-dimensional sheets composed of the transition metal cation and a first organic bridging ligand are layered wherein a second organic bridging ligand that is capable of coordinating with at least two coordination sites is coordinated with the transition metal cations existing in each of the layers so that the adjacent layered sheets are connected and the pores are formed between the layered sheets.

(5) A method according to item (4), wherein the transitional metal cation is a divalent copper ion, the first organic bridging ligand is terephthalic acid, and the second organic bridging ligand that is capable of coordinating with at least two sites is triethylenediamine (said coordination polymer is referred to hereinafter as $Cu_2(tp)_2ted$, wherein Cu is a divalent copper ion, tp is terephthalic acid, and ted is triethylenediamine).

(6) A method according to item (4), wherein the transitional metal cation is a divalent copper ion, the first organic bridging ligand is 2,3-pyrazinedicarboxylic acid, and the second organic bridging ligand that is capable of coordinating with at least two sites is 4,4'-bipyridyl (said coordination polymer is referred to as $Cu_2(pzdc)_2$ bpy, wherein Cu is a divalent copper ion, pzdc is 2,3-pyrazinedicarboxylic acid, and bpy is 4,4'-bipyridyl).

(7) A method according to any one of the items (1) to (6), wherein the monomer is styrene or 2-ethynylpyridine.

DETAILED DESCRIPTION OF THE INVENTION

The porous metal complex that may be employed in the present invention is typically a coordination polymer having a porous three-dimensional structure comprising a transition metal cation(s) and an organic bridging ligand connecting the transitional metals, and preferred is the coordination polymer having a structure in which a two-dimensional sheet composed of the transition metal cation and a first organic bridging ligand forms a layer, and a second organic bridging ligand that is capable of coordinating with at least two coordination sites is coordinated with the transition metal cations existing in each of the layers so as to connect the adjacent sheets to form the pores therebetween.

Examples of the transition metal cation include, for example, iron, cobalt, nickel, palladium, copper, zinc, cadmium, mercury, lead and manganese.

Among organic bridging ligands, examples of the first organic bridging ligand include, for example, dicarboxylic acids such as terephthalic acid (tp), 2,3-pyrazinedicarboxylic acid (pzdc), tetrafluoroterephthalic acid, 4,4'-bibenzoic acid, octafluoro-4,4'-bibenzoic acid, succinic acid, maleic acid, fumaric acid, acetylenedicarboxylic acid or the like.

Among organic bridging ligands, examples of the second organic bridging ligand include, for example, pyrazine, trans-1,2-bis(4-pyridyl)ethylene, 1,4-dicyanobenzene, 4,4'-dicyanobiphenyl, 1,2-dicyanoethylene, 1,4-bis(4-pyridyl)benzene, triethylenediamine (ted) and 4,4'-bipyridyl (bpy).

The coordination polymer that may be employed in the present invention can be synthesized by adding dropwise an aqueous alkali metal salt solution of the first organic bridging ligand into an aqueous solution of an inorganic salt of the transition metal and the second organic bridging ligand, for example, in the same manner as described in Angew. Chem. Int. Ed. 1999, 38, 140.

The entrance size of pores of the coordination polymer that may be employed in the present invention is usually designed to be 20 Å×20 Å or less, preferably 3 to 10 Å×3 to 10 Å.

The pore size can be estimated by a structure determined by single-crystal X-ray diffraction or powder X-ray diffraction. Nitrogen adsorption measurement can also be used to determine the pore size.

Any polymerizable monomer may be used in the present invention. Preferred monomer that may be employed in the present invention is an unsaturated organic compound, which is typically an unsaturated organic compound having 2 to 10 carbon atoms.

Examples of the unsaturated organic compound include, for example, ethylene, propylene, butene, pentene, hexene, heptene, octene, nonene, decene, butadiene, cyclopentene, cyclohexene, norbornene, norbornadiene, vinyl chloride, vinyl acetate, methoxyvinyl, acrylic acid, methyl acrylate, methacrylic acid, methyl methacrylate, styrene, vinylnaphthalene, vinylcyclohexane, acetylene, methylacetylene, 2-ethynylpyridine, and the like.

Accommodating the monomer in pores of the porous metal complex in the present invention can be conducted, for example, by a method of directly contacting a monomer with the porous metal complex in the case where a monomer is gas or liquid in a similar manner, for example, as described in Angew. Chem. Int. Ed. 1999, 38, 140. The monomer may be dissolved in a suitable organic solvent and thereafter contacted with the porous metal complex. Examples of the organic solvent that may be used here include, for example, aliphatic hydrocarbons such as pentane, hexane, heptane, octane, isooctane, cyclopentane, methylcyclopentane, cyclohexane, methylcyclohexane, cyclooctane decalin or the like, aromatic hydrocarbons such as benzene, toluene, xylene, cumene, ethylbenzene, monochlorobenzene, dichlorobenzene or the like, and halogenated hydrocarbons such as dichloromethane, chloroform, carbon tetrachloride, dichloroethane or the like.

A desired polymer can be obtained by accommodating the unsaturated organic compound in pores of the porous coordination polymer of the present invention and then polymerizing or copolymerizing.

Polymerization or copolymerization is typically initiated by heating or irradiating light in the presence or absence of a radical initiator, or by reacting an acidic substance.

The polymerizing or copolymerizing is typically conducted at −20 to 350° C., preferably 0 to 250° C.

Examples of the radical initiator that may be used include, for example, a compound typically used as an initiator of radical polymerization such as azobisisobutyronitrile (AIBN) or benzoyl peroxide.

Examples of the acidic substance that may be used include, for example, a compound typically used as an initiator of cationic polymerization such as aluminum chloride, sulfuric acid or hydrochloric acid.

The polymer obtained by the method of the present invention is typically provided in a state of being accommodated in the porous metal complex. The polymer can be isolated out of the pore of the complex by decomposing the porous metal complex with an aqueous acidic or alkaline solution and thereafter extracted with a suitable organic solvent or collected by filtration, if necessary.

In the production of the polymer of the present invention, the orientation property and reaction pattern thereof are determined by an internal structure of the pores of the porous metal complex, and the polymer length is determined by the length of pores of the porous metal complex, so that a desirable polymer can be obtained by controlling the structure of pores of the porous metal complex. The polymer obtained by the method of the present invention is a promising candidate as functional polymer material for electronic device or mechanically strong polymer article.

EXAMPLES

The present invention is further detailed hereinafter by examples but is not to be construed to be limited thereto.

Reference Example 1

A coordination polymer $Cu_2(tp)_2$ted was synthesized by adding a solution of copper sulfate in methanol into a solution of tp in formic acid/methanol (1/100) and stirring at room temperature for several days, and thereafter a toluene solution of ted was added thereto and heated in an autoclave at a temperature of 433 K for several hours. The resulting crystals were collected by filtration, in accordance with a manner described in J. Phys. Chem. B 2002, 106, 1380. The one-dimensional pore size of the obtained complex was 7.8 Å×7.8 Å.

Reference Example 2

A coordination polymer $Cu_2(pzdc)_2$ bpy was synthesized, in accordance with a manner described in Angew. Chem. Int. Ed. 1999, 38, 140, by reacting a sodium salt of pzdc, copper perchlorate and bpy in ethanol/water (1/1) solvent and collecting the resulting crystals by filtration. The one-dimensional pore size of the obtained complex was 8 Å×6 Å.

Example 1

200 mg of $Cu_2(tp)_2$ted synthesized in Reference Example 1 was charged into a reaction tube made of Pyrex (registered trademark) and dried under a reduced pressure of 80 Pa at a temperature of 130° C. for 3 hours. Subsequently, 0.5 mL of styrene and 17 mg of AIBN were charged therein at room temperature and excessive styrene was removed by distillation under a reduced pressure of 80 Pa at room temperature over 2 hours. Thereafter, the reaction tube was heated up to a temperature of 70° C. and reacted for 48 hours. After completion of the reaction, the obtained powder was washed with methanol and dried at room temperature to give $Cu_2(tp)_2$ted accommodating polystyrene.

Comparative Example 1

Polymerization was conducted under the same polymerization conditions as Example 1 in the absence of a coordination polymer $Cu_2(tp)_2$ted to obtain polystyrene, of which molecular weight was measured by GPC, and it was found that the polymer had a molecular-weight distribution (Mw/Mn) of 4.68.

Example 2

Polystyrene-containing $Cu_2(tp)_2$ted obtained in Example 1 was charged into 0.1N aqueous sodium hydroxide solution to decompose the coordination polymer and thereafter extracted with chloroform and concentrated to isolate the resulting polystyrene. The molecular weight of the obtained polystyrene was measured by GPC to reveal a number-average molecular weight (Mn) of 42,800 and a molecular-weight distribution (Mw/Mn) of 2.05. Polystyrene with narrow molecular-weight distribution could be obtained as compared with Comparative Example 1.

Example 3

200 mg of $Cu_2(pzdc)_2$ bpy synthesized in Reference Example 2 was charged into a reaction tube made of Pyrex (registered trademark) and dried under a reduced pressure of 80 Pa at a temperature of 110° C. for 5 hours, and thereafter 0.5 mL of 2-ethynylpyridine was added dropwise thereto under nitrogen atmosphere at room temperature. After 24 hours, the reaction mixture was then washed with chloroform and water to give 199 mg of a powdery composite containing a polymer of 2-ethynylpyridine accommodated in the complex.

Example 4

Poly(2-ethynylpyridine)-containing $Cu_2(pzdc)_2$ bpy obtained in Example 3 was added to 0.1N aqueous sodium hydroxide solution to decompose the coordination polymer and thereafter extracted with dimethylformamide and concentrated to give polyethynylpyridine. The measurement of the molecular weight of the obtained polyethynylpyridine by GPC revealed that the polymer had a molecular weight of approximately 1000 to 2000 (in terms of polystyrene).

Example 5

The electrical conductivity of the poly(2-ethynylpyridine)=$Cu_2(pzdc)_2$ bpy composite obtained in Example 3 was measured to be $10^{-8}$ S/cm or less by a direct current two-terminal method.

Example 6

Poly(2-ethynylpyridine)=$Cu_2(pzdc)_2$ bpy composite obtained in Example 3 was dried by heating under reduced pressure and exposed to iodine vapor under nitrogen atmosphere for 3 hours to dope with iodine. The electrical conductivity of this iodine-doped composite was measured to be $10^{-8}$ S/cm or less as in Example 5.

Generally, the attachment of poly(2-ethynylpyridine) to a crystal surface allows electrical conductivity; however, this composite did not exhibit conductivity. This denotes that the polymer is properly accommodated in the pores. The same phenomenon is known also in a conductive polymer present in pores of zeolite (J. Phys. Chem. 1989, 93, 6270).

It was found from this measurement of electrical conductivity that a conductive path of this polymer is not one molecular chain and that the hopping of electrons between molecular chains is important.

What is claimed is:

1. A method for producing a polymer, which comprises polymerizing or copolymerizing an organic compound monomer or monomers accommodated in pores of a porous metal complex, wherein the porous metal complex is a coordination polymer having a porous three-dimensional structure composed of a transition metal cation(s) and an organic bridging ligand connecting the metal cations.

2. A method according to claim 1, wherein the organic compound monomer or monomers is at least one unsaturated organic compound having 2 to 10 carbon atoms.

3. A method according to claim 2 wherein the coordination polymer has a structure in which
two-dimensional sheets composed of the transition metal cation and a first organic bridging ligand are layered wherein a second organic bridging ligand that is capable of coordinating with at least two coordination sites is coordinated with the transition metal cations existing in each of the layers so that the adjacent layered sheets are connected and the pores are formed between the layered sheets.

4. A method according to claim 3, wherein the transitional metal cation is a divalent copper ion, the first organic bridging ligand is terephthalic acid, and the second organic bridging ligand that is capable of coordinating with at least two sites is triethylenediamine.

5. A method according to claim 3, wherein the transitional metal cation is a divalent copper ion, the first organic bridging ligand is 2,3-pyrazinedicarboxylic acid, and the second organic bridging ligand that is capable of coordinating with at least two sites is 4,4'-bipyridyl.

6. A method according to claim 1, wherein the monomer is styrene or 2-ethynylpyridine.

* * * * *